United States Patent [19]
Chang et al.

[11] Patent Number: 5,267,054
[45] Date of Patent: Nov. 30, 1993

[54] METHOD AND APPARATUS FOR THE REDUCTION OF MEMORY SPACE REQUIRED FOR A DIGITAL HALFTONE SYSTEM

[75] Inventors: Sheue L. Chang, San Jose; James Gosling, Mountain View, both of Calif.

[73] Assignee: Sun Microsystems, Inc., Mountain View, Calif.

[21] Appl. No.: 721,138

[22] Filed: Jun. 26, 1991

[51] Int. Cl.⁵ ............................................. H04N 1/40
[52] U.S. Cl. ................................. 358/456; 358/457; 358/465; 358/455
[58] Field of Search ............... 358/455, 456, 457, 458, 358/459, 460, 461, 448, 465, 466

[56] References Cited
U.S. PATENT DOCUMENTS

| | | | |
|---|---|---|---|
| 4,977,464 | 12/1990 | Ikuta | 358/458 |
| 4,987,498 | 1/1991 | Shimazaki | 358/456 |
| 5,150,428 | 9/1992 | Leone et al. | 358/465 |

Primary Examiner—Richard E. Chilcot, Jr.
Assistant Examiner—Rafael Bacares
Attorney, Agent, or Firm—Blakely Sokoloff Taylor & Zafman

[57] ABSTRACT

In the image generation method and apparatus of the present invention, an image generation apparatus is provided in which a digital halftone cell of threshold values is generated and broken down into a plurality of tiles determined from the locations of the four corners of the halftone cell. The tiles when put together form a bounding box around the halftone cell. These tiles are arranged into a threshold array of threshold values wherein the width of the array is equal to the number of threshold values in a sequence of threshold values across a row of contiguous tiles and the height of the array is equal to the greatest common denominator of the x axis increment and y axis increment between vertices of the halftone cell.

The threshold array is stored in memory for subsequent reference during the halftoning process. Through the method and apparatus of the present invention the amount of memory required to store threshold values is reduced substantially while the speed and ease of accessing the threshold values during the halftone process is maintained.

21 Claims, 18 Drawing Sheets

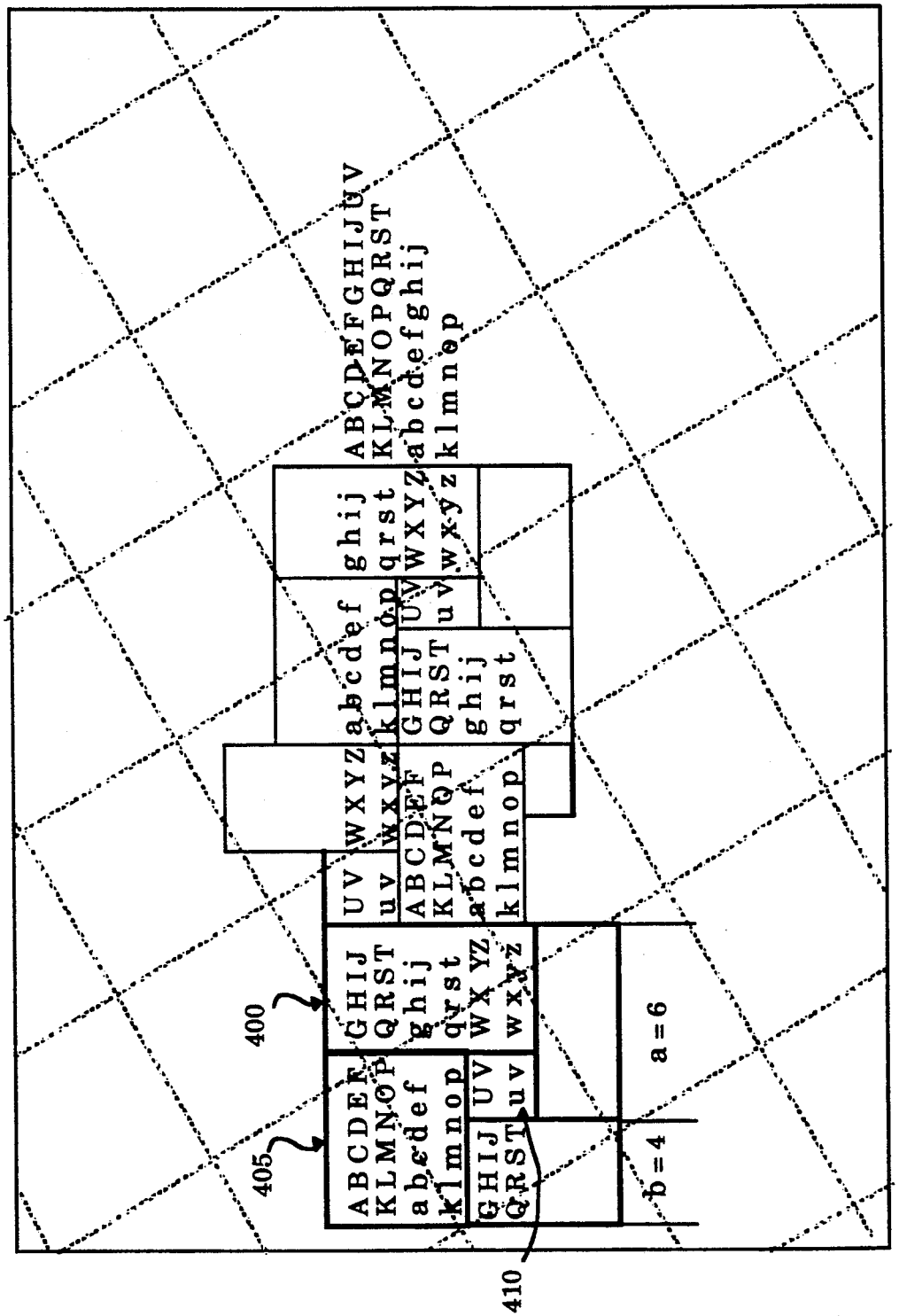

(0+4) mod 6=4
A B C D E F G H I J
0

(4+4) mod 6=2
U V W X Y Z
4

(2+4) mod 6=0
a b c d e f g h i j | A B C D
2                                        0

(1+4) mod 6=5
K L M N O P Q R S T
1

(5+4) mod 6=3
u v w x y z
5

(3+4) mod 6=1
k l m n o p q r s t | K L M N
3                                      1

| | | |
|---|---|---|
| 0 | 4 | 2 |
| 1 | 5 | 3 | h = 2

| A B C D E F G H I J U V W X Y Z a b c d e f g h i j |
| K L M N O P Q R S T u v w x y z k l m n o p q r s t |

*Figure 10e*

METHOD AND APPARATUS FOR THE REDUCTION OF MEMORY SPACE REQUIRED FOR A DIGITAL HALFTONE SYSTEM

BACKGROUND OF THE INVENTION

1. Field of the Invention

The method and apparatus of the present invention relates to the field of digital halftoning. More particularly, the present invention relates to the storage of halftone cells in an optimum manner to save memory space while maintaining performance.

2. Art Background

The technique of halftoning is widely used in the printing industry for printing continuous tones of images, such as photographs, in a discrete form using a limited number of colors. For example, a monochrome image, such as photographs which appear in newspapers, are represented using two colors, black and white, and are produced typically by generating black dots on white paper. Color images, such as those found in magazines or newspapers, are represented by a small limited number of colors. Halftoning takes advantage of spatial integration in order to generate the image. Spatial integration is performed by the eye when viewing a small area from a large viewing distance wherein the eye averages fine detail within the small area and records only the overall intensity and color of the area.

By grouping multiple display elements into small grids or matrices, called halftone grids, the spatial resolution of the display output is decreased and the overall intensity levels or gray levels representable in an area is increased. For example, by grouping four display elements into a 2×2 matrix, the spatial resolution of the display output is decreased by half, but the amount of gray levels representable are increased to five.

The halftone grid is defined by mapping a uniform grid of small matrices, referred to as halftone cells, over the display device output pixel array (hereinafter referred to as the display space). The halftone grid has a frequency (the number of halftone cells per unit measure in the display space) and an angle (the orientation of the grid relative to the display space coordinate system). Each display element (referred to as a "pixel") of the display space corresponds to one element in the halftone cell. An area of the display screen can be made to approximate a shade of gray by turning a certain amount of the pixels within the area on (e.g. "white") or off (e.g. "black") in a predetermined pattern and sequence. In a display device such as a printer, the background is initialized to be white reflecting the fact that the image will be subsequently output to be printed on white paper and the pixels actuated are output as black "dots" reflecting the ink printed on the white paper. In a display device such as a computer graphic display device, the background is typically initialized to a black or dark color and the pixels actuated are "turned on" and appear as a white dot or light color on the screen. For purposes of explanation, the following description will refer to actuated pixels as being white. However, it is obvious to one skilled in the art that depending upon the system and output device, the actuated pixels may be other predetermined colors. In particular, in a corresponding printed image, the actuated pixels would be black.

Numerically, the gray level represented within a cell is the ratio of the number of pixels that are white to the total number of pixels in that cell. As a cell's gray value varies from black to white, increasingly more pixels in each cell change from black to white in a defined sequence. The order in which pixels change from black to white for increasing gray levels is specified by a user with a mathematical function called a dot or spot function. The spot function is used to calculate a plurality of threshold values, one value associated with each display element in the halftone cell. The differing magnitudes of the threshold values dictate the sequence in which pixels change from black to white for increasing gray level, that is, the threshold values are compared to the value representative of the desired intensity level. If the threshold value associated with a particular display pixel is greater than the desired intensity level of an area, the pixel is actuated. For further information on the halftoning process, see, Foley, et al., *Computer Graphics, Principles and Practice, Second Edition*, pp 569–573 (Addison-Wesley Publishing 1990); Ulichney, *Digital Halftoning*, (MIT Press 1987); Adobe Systems, Inc., *POSTSCRIPT Language Reference Manual*, pp 84–87 (Addison-Wesley Publishing 1986).

Typically, one binary representation of the halftone cell for each different intensity level is calculated according to the user specified spot function, halftone frequency and halftone angle. This binary representation is called a gray pattern. A collection of gray patterns for all possible intensity levels are precomputed and stored in memory. When generating a halftone image, the gray pattern for a particular intensity is then retrieved from memory as needed to determine the pixels to be actuated. The more pixels which compose a halftone cell, the greater the number of different intensities that can be represented and the greater the amount of memory required to store the gray patterns.

The threshold values generated by the spot function are dependent upon the location of the pixels in the halftone cell relative to the center of the halftone cell. If each halftone cell is consistently aligned with the pixels in the display space, a small halftone cell can be used to replicate across the entire display space and a single threshold array can be employed to determine the order of the pixels to be actuated to render an entire image. However, typically the halftone grids do not align exactly with the display space grid. It is a complex process to consistently align each halftone cell with the display space grid because the grid size of the halftone cell is normally not the same grid size as the display space and the matrix of halftone cells is typically at a different angle of orientation from the display space grid. If a threshold value is generated for each pixel of the display space, an infinite amount of different halftone cells would have to be computed to address each possible configuration of pixel locations within a cell.

The problem of aligning the halftone cell to the display space is illustrated by FIG. 1. The halftone cells are mapped at an angle to the matrix of pixels of the display space. Although one vertex of the cell 50 maps directly to a pixel location (in FIG. 1 pixel locations occur at the intersection of the grid lines), the remaining vertices 30, 40, 60 do not. Similarly, the adjoining halftone cell, having vertices 10, 20, 30, 40, does not align precisely with the pixel matrix. Because the relative pixel locations within each halftone cell vary from halftone cell to halftone cell, the threshold values generated for each pixel location would be different in each halftone cell.

To overcome this problem, a technique has been devised to align the halftone cells with the pixel matrix with the minimal of error wherein the vertices of the halftone cell are rounded off to the closest pixel. This may be visualized by referring to FIG. 2a. Utilizing the length of one side of a cell $R_d$ which directly corresponds to the user specified halftone frequency and the desired halftone cell angle with respect to the coordinate space $\theta_d$, the revised cell frequency value is determined according to the following equations:

$$a = \text{INT}[R_d \cos(\theta_d)]$$

$$b = \text{INT}[R_d \sin(\theta_d)]$$

where $R_d$ is the desired length of a side of the halftone cell, $\theta_d$ represents the desired angle of the halftone cell with respect to the display space, INT represents an integer rounding function which rounds the vertex to the closest pixel. The "a" value represents the incremental integer amount (in units such as pixels) from one vertex to the adjacent vertex along a first axis (e.g., the x axis) and "b" represents the incremental integer amount along the second axis (e.g., the y axis). Thus, the actual length of the halftone cell ($R_a$) is equal to SQRT ($a^2 + b^2$) and the actual angle is $\theta_a$, where $\theta_a$ is equal to ARCTAN (b/a) and SQRT represents a square root function and ARCTAN represents an arctangent function. Hereinafter $\theta d$ is referred to as the "desired halftone angle" and $\theta_a$ is referred to as the "actual halftone angle". $R_d$ is referred to as the "desired cell frequency", and $R_a$ is the "actual cell frequency." Using the actual halftone angle $\theta_a$, the actual cell frequency $R_a$, and the values a and b, the adjusted halftone cells can be constructed. The adjusted halftone cells can be constructed, as illustrated in FIG. 2b, across the display space to complete the mapping of halftone cells to the matrix of display space. The actual halftone cells constructed are of equal size and align with the pixels of the display space whereby one single threshold matrix is applicable to all halftone cells.

The drawback to this technique is the error introduced by adjusting the halftone cell. The angle of the actual halftone cell to the display coordinate space ($\theta_a$) and the length of a side of the actual halftone cell ($R_a$) vary slightly from the desired angle and frequency ($\theta_d$ and $R_d$) introducing a small error.

The error between the actual frequency $R_a$, the actual angle $\theta_a$ and the desired frequency $R_d$ and the desired angle $\theta_d$ can be decreased by constructing "supercells," as illustrated in FIG. 3, which are composed of a plurality of halftone cells. The angle of the supercell to the display space and the actual frequency of the halftone cell can be adjusted to be quite close to the user desired angle and frequency by increasing the number of halftone cells contained in each supercell. The larger the supercell, the smaller the adjustment error, but the greater the size of memory required to store the supercell containing the threshold values. Thus, there is a tradeoff between precision, i.e. the size of the adjustment error, and the amount of memory required. Typically, the tradeoff is resolved by the user setting a predetermined tolerance and generating a supercell that is within the tolerance. For example, if the user specified angle is 15° and the tolerance is set to be 0.01°, a supercell would be generated that has an angle within the range of 14.99° to 15.01°. Once the size of the halftone cell is determined, the cells are "stitched" together across the display space.

The amount of memory required to share the threshold array is very important with respect to the cost and performance of the system. Depending upon the tolerance of angle and frequency specified by a user, the storage of information can take up a lot of memory. In addition, typical storage techniques fluctuate according to the angle of the halftone cell relative to the display space.

SUMMARY OF THE INVENTION

It is therefore an object of the present invention to provide a method and apparatus for storing halftone cells in the minimum amount of memory space.

It is an object of the present invention to provide a method and apparatus for storing halftone cells for rapid and easy retrieval utilizing the minimum amount of memory space.

In the method and apparatus of the present invention, an image generation apparatus is provided in which a digital halftone cell of threshold values is generated and broken down into a plurality of tiles determined from the locations of the four corners of the halftone cell. The tiles when put together form a bounding box around the halftone cell. These tiles are arranged into a threshold array of threshold values wherein the width of the array is equal to the number of threshold values in a sequence of threshold values across a row of contiguous tiles and the height of the array is equal to the greatest common denominator of the x axis increment and y axis increment between vertices of the halftone cell.

The threshold array is stored in memory for subsequent reference during the halftoning process. Through the method and apparatus of the present invention the amount of memory required to store threshold values is reduced substantially while the speed and ease of accessing the threshold values during the halftone process is maintained.

BRIEF DESCRIPTION OF THE DRAWINGS

The objects, features and advantages of the present invention will become apparent from the following description of the invention in which.

DETAILED DESCRIPTION OF THE INVENTION

Notation And Nomenclature

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

General System Configuration

Figure 4:
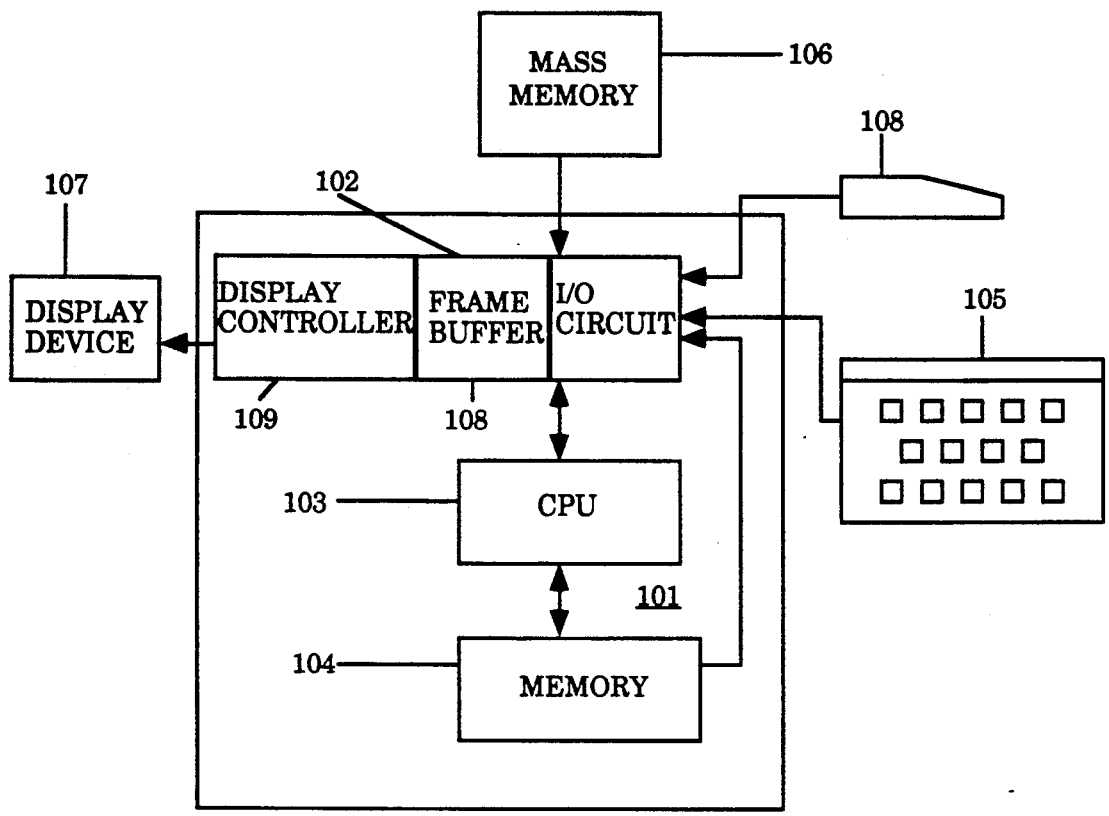
FIG. 4 is an illustrative computer system utilized in the system of the present invention.

FIG. 4 shows a typical computer-based system for rendering digital halftone images according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 4 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104. A cursor control 108 is used to select command modes and edit the input data, and in general provides a more convenient means to input information into the system.

In addition, a display monitor 107 is illustrated which is used to display messages or other communications to the user. Such a display monitor may take the form of any of several well-known varieties of CRT displays. Preferably, the display monitor 107 may also display the graphic images, i.e., digital halftone images rendered according to the process of the present invention. The raster display monitor is composed of a matrix of display elements, referred to as pixels, which are actuated or "turned on" in a predetermined manner to form an image. The image data representative of the image to be displayed is first written to the frame buffer 108. The image data identifies the color, intensity and location of each display element to be actuated. A display controller 109 reads the image data from the frame buffer and actuates the pixels to generate the image.

Process Description

Figure 1:
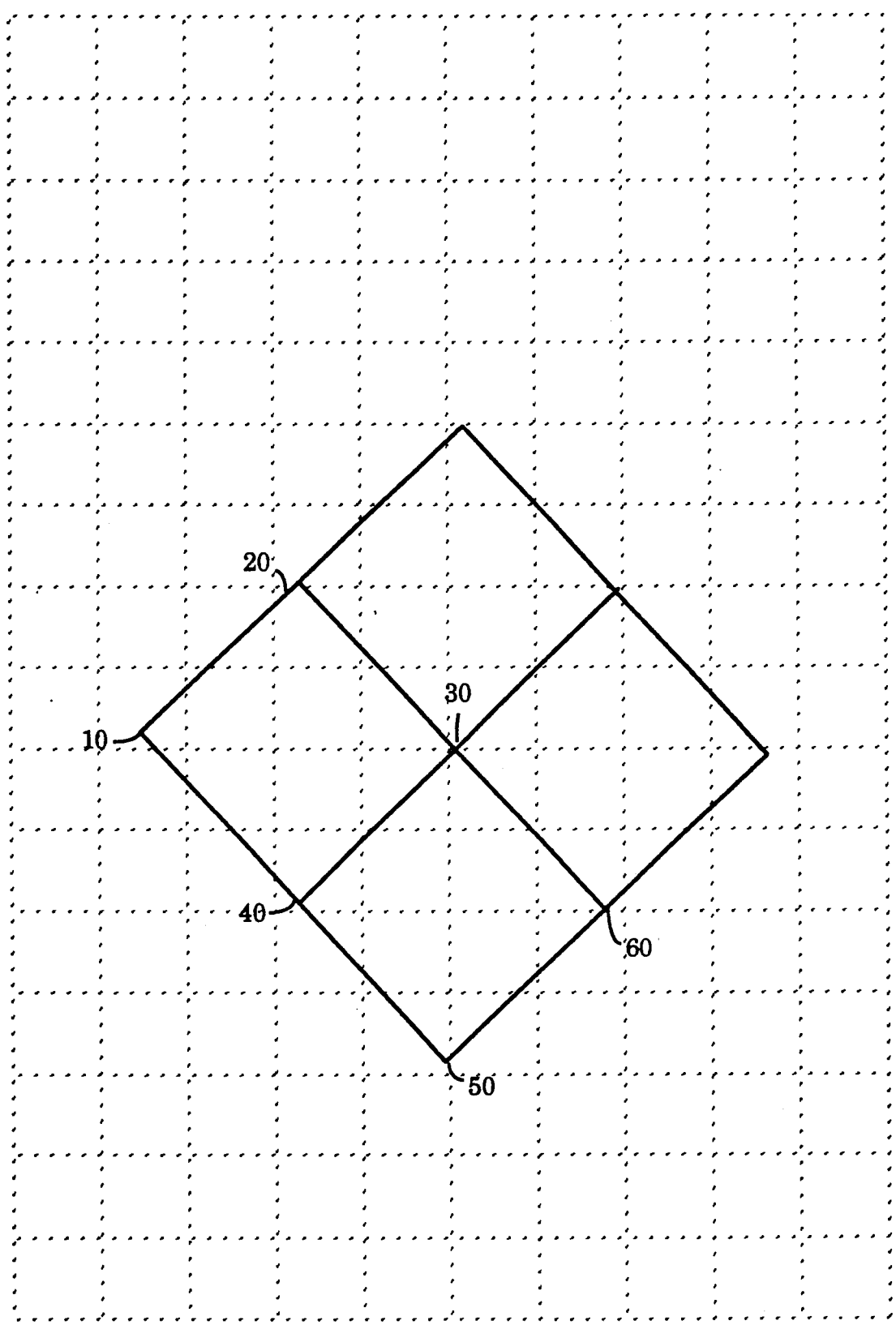
FIG. 1 illustrates four adjacent halftone cells.
Figure 2A:
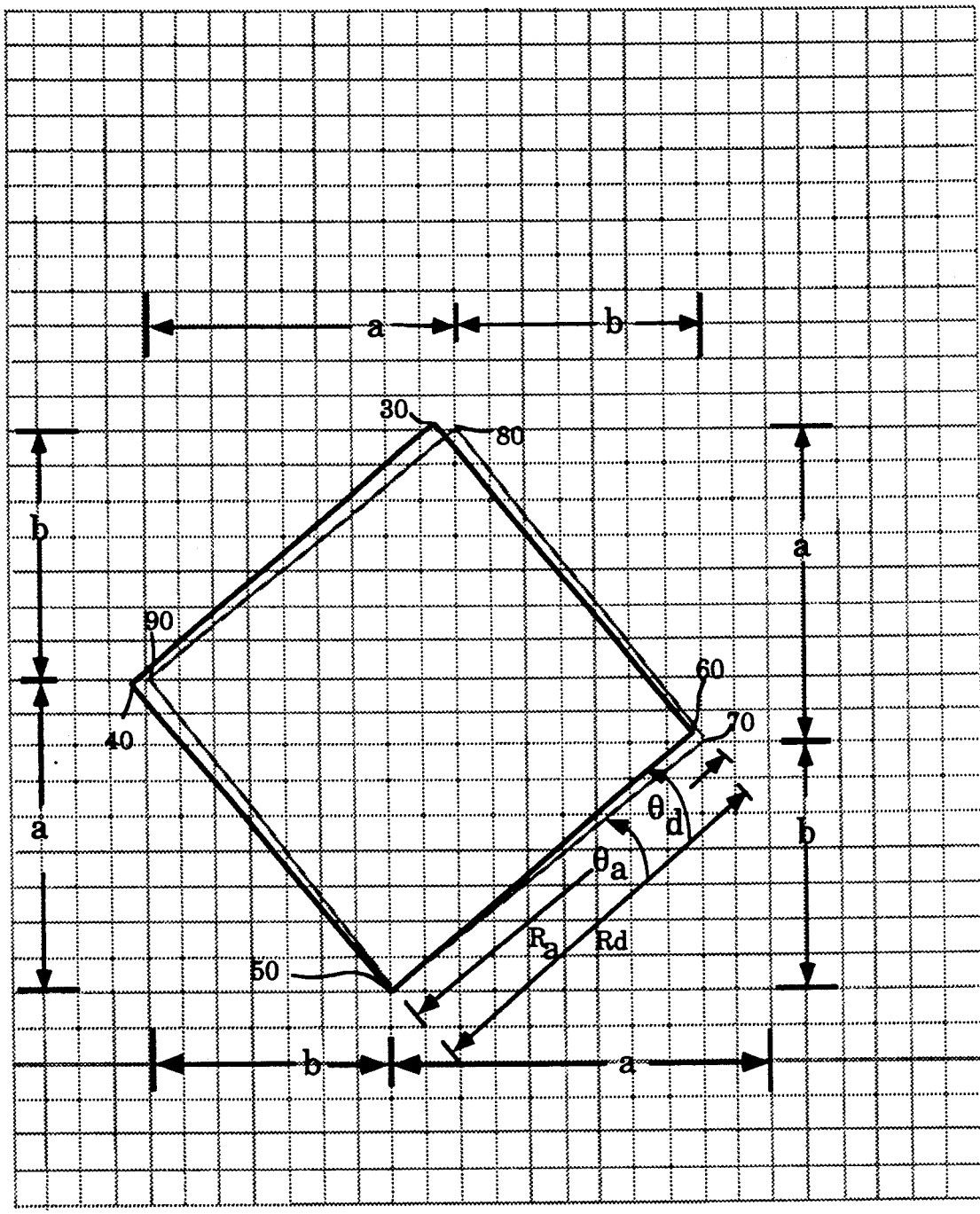
FIGS. 2a and 2b illustrate the adjustment of the halftone cell to conform to the display space grid.
Figure 2B:
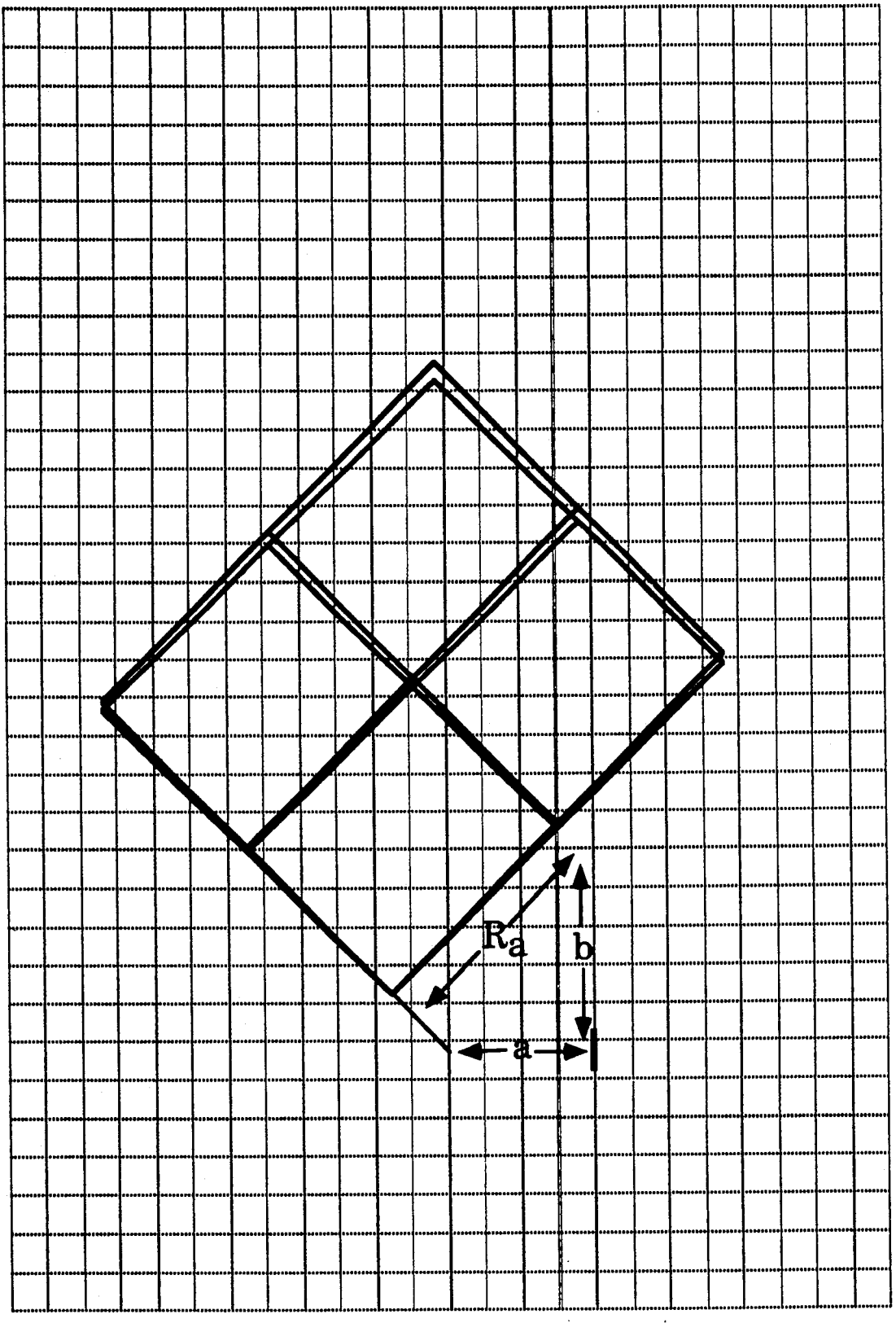
Figure 3:
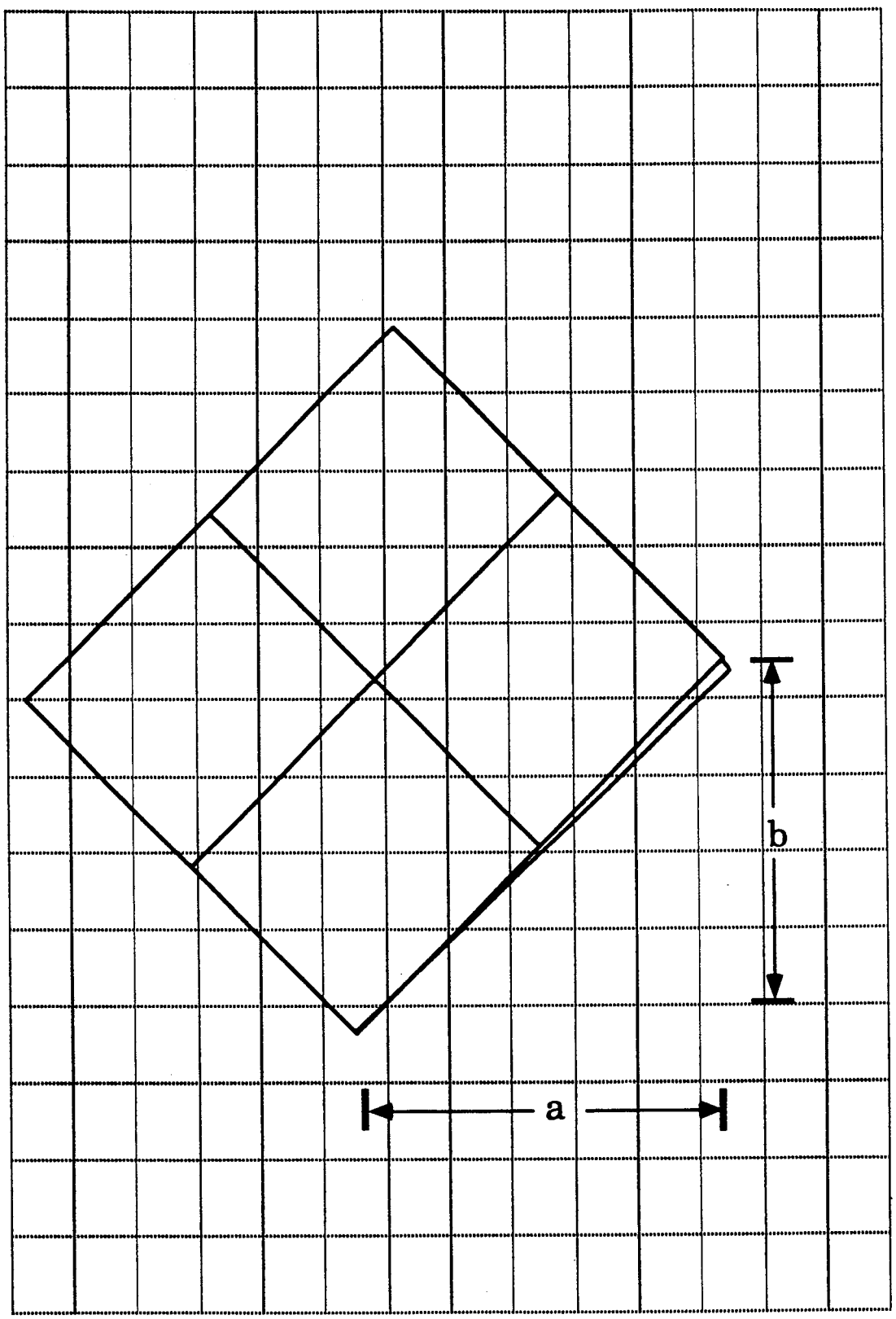
FIG. 3 illustrates a halftone "supercell" composed of a multiple of adjacent halftone cells.

A preferred embodiment of the digital halftone process of the present invention will be discussed in reference to the flow charts of FIGS. 6a and 6b. At block 200 the user specifies the frequency of the halftone cell to be generated, the angle of the halftone cell is to be oriented with respect to the display space grid and a tolerance that the angle can vary within and still be within limits. For example, the user may specify a halftone frequency of sixty halftone cells per inch at an angle of 15° and a tolerance of 0.01 degrees. For example, referring to FIG. 2a, the desired halftone cell has vertices or end points 30, 40, 50 and 60. At block 210 of FIG. 6a, a halftone cell adjusted to the display space grid is generated. The adjusted halftone cell has end points 80, 90, 50 and 70. The adjusted halftone cell end points are determined using the following equations:

$$a = \text{INT}[R_d \cos(\theta_d)]$$

$$b = \text{INT}[R_d \sin(\theta_d)]$$

Where $R_d$ is the desired length of the side of the halftone cell, $\theta_d$ represents the desired angle of the halftone cell with respect to the display space and INT represents an integer rounding function which rounds the value to the closest integer.

The "a" value provides the incremental integer amount in units of the display space (e.g. pixels) from one vertex of the halftone cell, for example vertex 50, to the adjacent vertex, vertex 70, along a first axis (e.g., the x axis) and "b" represents the incremental integer amount along the second axis (e.g., the y axis). To determine the next vertex, vertex 80, of the cell in the diagonal direction relative to the vertex determined, the value of a is used as the incremental integer amount along the second axis and the value of b is used as the incremental integer amount along the first axis. Similarly, the next vertex, vertex 90, is determined using the value of a as the incremental amount along the first axis and the value of b along the second axis.

Figure 5A:
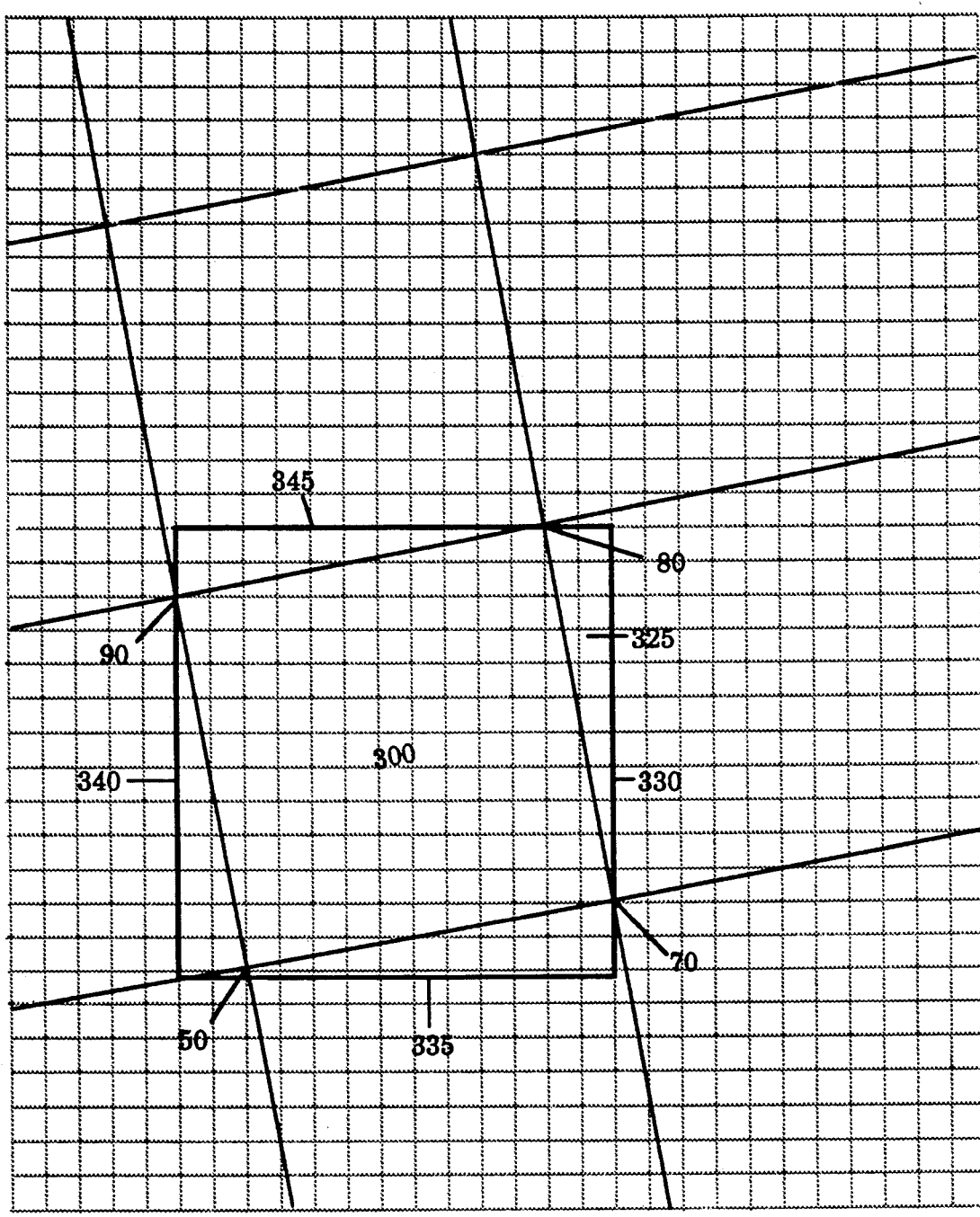
FIG. 5a illustrates a bounding box generated around the halftone cell.
Figure 5B:
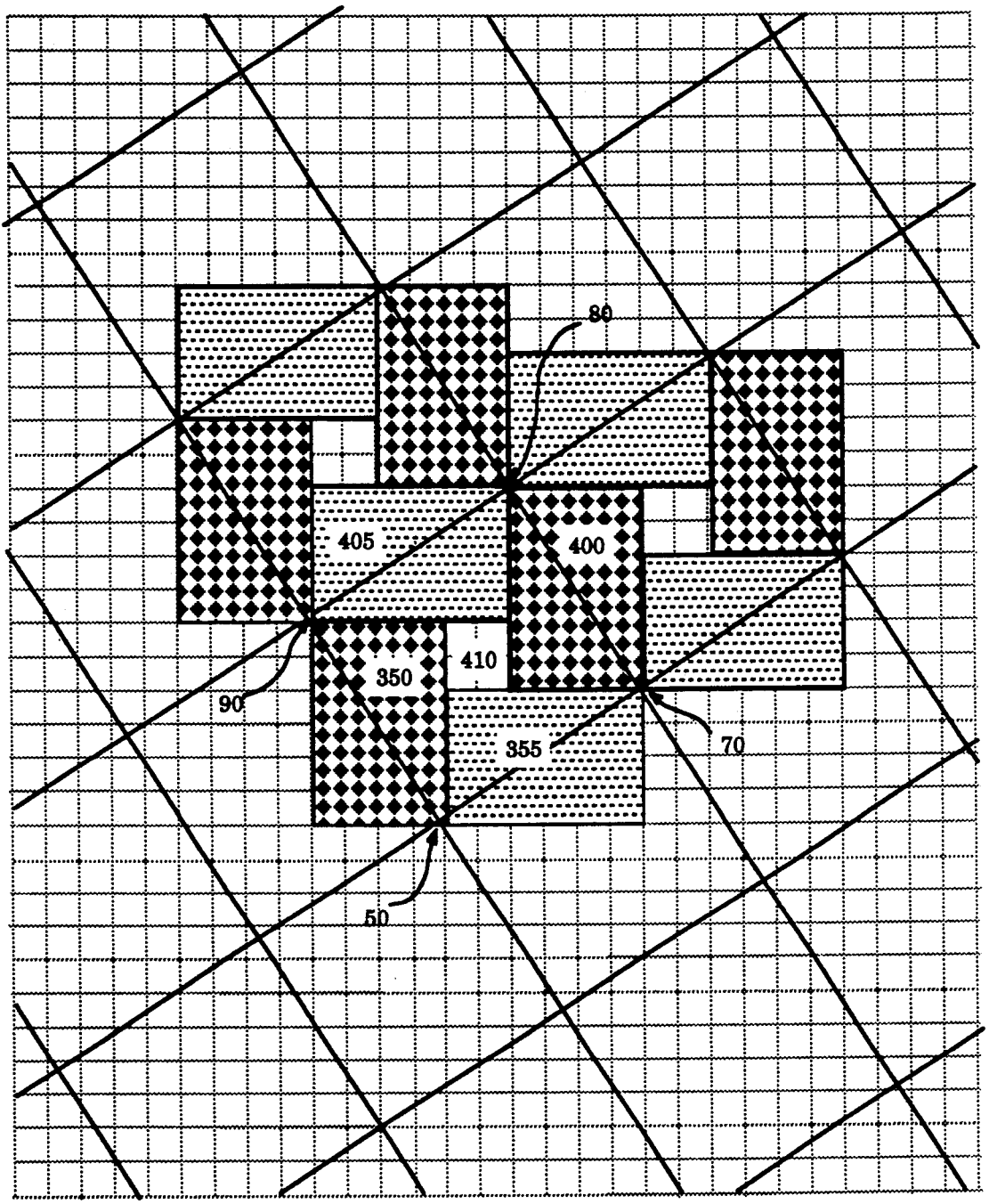
FIG. 5b illustrates the tiles generated in the preferred embodiment of the present invention.

As illustrated in FIG. 5a, this process may be continued to determine all adjacent vertices, 50, 70, 80, 90, and bounding boxes. The bounding box is a square oriented on the x and y axes which encompasses the adjusted halftone cell with edges 330, 335, 340, and 345. Each side of the bounding box intersects a vertex of the halftone cell and the axis that each side of the bounding box is oriented on is the major axis of the corresponding side of the halftone cell. The length of each edge is the size of a+b. As will be explained, the bounding box is mapped to the display space. Preferably, to save computational time and expense, the vertices for a single bounding box are determined. The same bounding box can then be applied to the entire display space thereby saving memory and simplifying the rendering process. Thus it is preferred that a single cell is constructed and the vertices determined using a and b. This may be graphically seen referring to FIG. 5a which shows the halftone cell 300 at a predetermined angle with respect to the display space grid which runs in a horizontal and vertical orientation of 0° and 90°. Tiles which are used to represent the halftone cell may be graphically determined by first drawing the bounding box 325 around the vertices 50, 70, 80 and 90 of the adjusted halftone cell, block 220. This bounding box 325 has a first side 330, second side 335, third side 340 and fourth side 345. At block 220 the tiles which are to be used to represent the halftone cell are then constructed. Referring to FIG. 5b, five tiles are constructed 350, 355, 400, 405, and 410. These five tiles 350, 355, 400, 405 and 410 form a bounding box around the adjusted halftone cell 300. The tiles are delineated by the lines connecting the vertices 50, 70, 80 and 90 of the adjusted halftone cell. These tiles are representative of the threshold values stored in memory to represent the halftone cells of the display space. It should be observed that tile 350 is a duplicate of tile 400 and tile 355 is the same as tile 405, and do not need to be separately represented in memory. Thus the entire display space is defined by the three tiles 400, 405 and 410. The tiles are mapped the same with respect to each other regardless of the location of the tiles in the display space, thereby providing a straightforward means for utilizing the tiles.

Figure 7A:
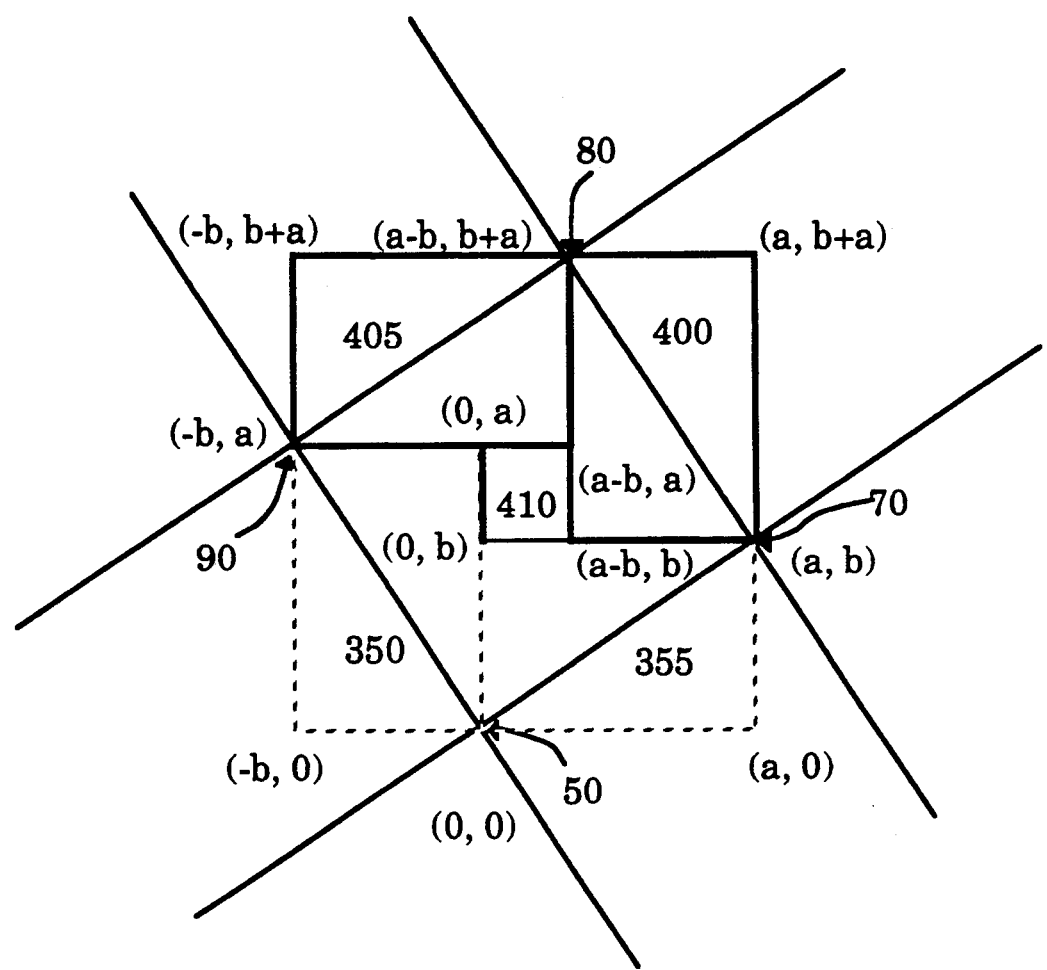
FIGS. 7a and 7b illustrate the generation of tile in the preferred embodiment of the present invention.

The three tiles 400, 405, 410 generated are simply rectangles. Referring to FIG. 7a, the size and orientation of the tiles with respect to the bounding box will now be described. A first vertex 50 is established to be at x,y coordinate location (0,0). The adjacent vertex 70 would then be at location (a,b) because as discussed above the incremented value along the x axis is equal to a and the incremented value along the y axis is equal to b. The next vertex 80 is at B location (a−b, b+a) because the incremental value in x is equal to b and the incremental value in y is equal to a. It follows that the last vertex 90 is at location (−b,a). Similarly, the number, size and shape of the tiles are dependent upon the size and orientation (i.e., the value of $\theta$) of the cell. For example, if $\theta_a$ is equal to 0°, 90° or 180° only one tile will be generated. If $\theta_a$ is equal to 45°, 135°, 225°, or 315°, two tiles will be generated. However, typically 3 tiles are generated.

The first tile 405 is generated according to adjacent vertices whereby the vertices form opposing vertices of a rectangular tile. These vertices may be viewed as the endpoints of the diagonal line through the rectangle. As shown in FIG. 7a, using the two vertices 80 and 90 of the halftone cell (a−b, b+a) and (−b,a), the remaining two tile vertices are easily determined to be the remaining vertices of the rectangle at locations (a−b, a) and (−b, b+a).

The second tile 400 is similarly determined using the vertex 70 (a,b) and vertex 80 (a−b, b+a) as the endpoints of the diagonal line through the rectangle. Thus the vertices of the second rectangle are (a−b, b), (a,b), (a,b+a) and (a−b,b).

The third tile 410 has a common vertex (a−b,b) with the second tile 400 and a common vertex (a−b,a) with the first tile 405. The third vertex is established at the location collinear with the first vertex of the cell (0,0) and is collinear with the second vertex (a,b) of the cell. Thus the vertex is located at (0,b) and forms the diagonal across the square formed with (a−b,a). Simple geometry indicates that the fourth vertex is located at (0,a).

The remaining two tiles 350 and 355 which cover the cell [(0,0), (0,a), (−b,a), (−b,0)] and [(a,0), (a,b), (0,b), (0,0)] are simple repetitions of the first tile 405 and the second tile 400 tile and therefore do not need to be stored in memory. Instead, during the halftoning process these three tiles will be referred to for retrieval of threshold values.

Figure 7B:
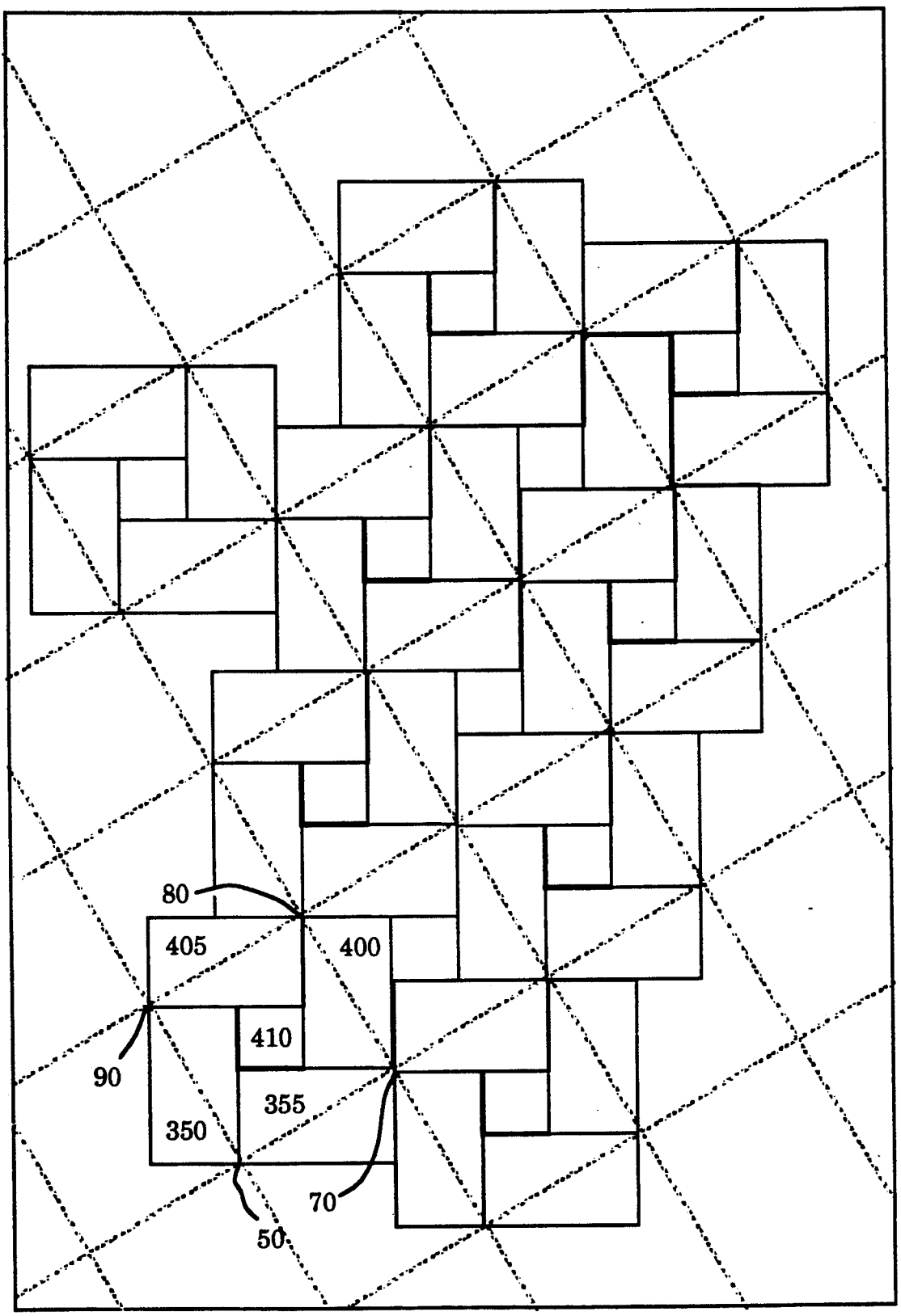

FIG. 7b is a visual illustration of the mapping of the tiles across a simple address space. The spatial relationship among the three tiles are constant, and the process of mapping the tiles to the display space is simplified.

Figure 6A:
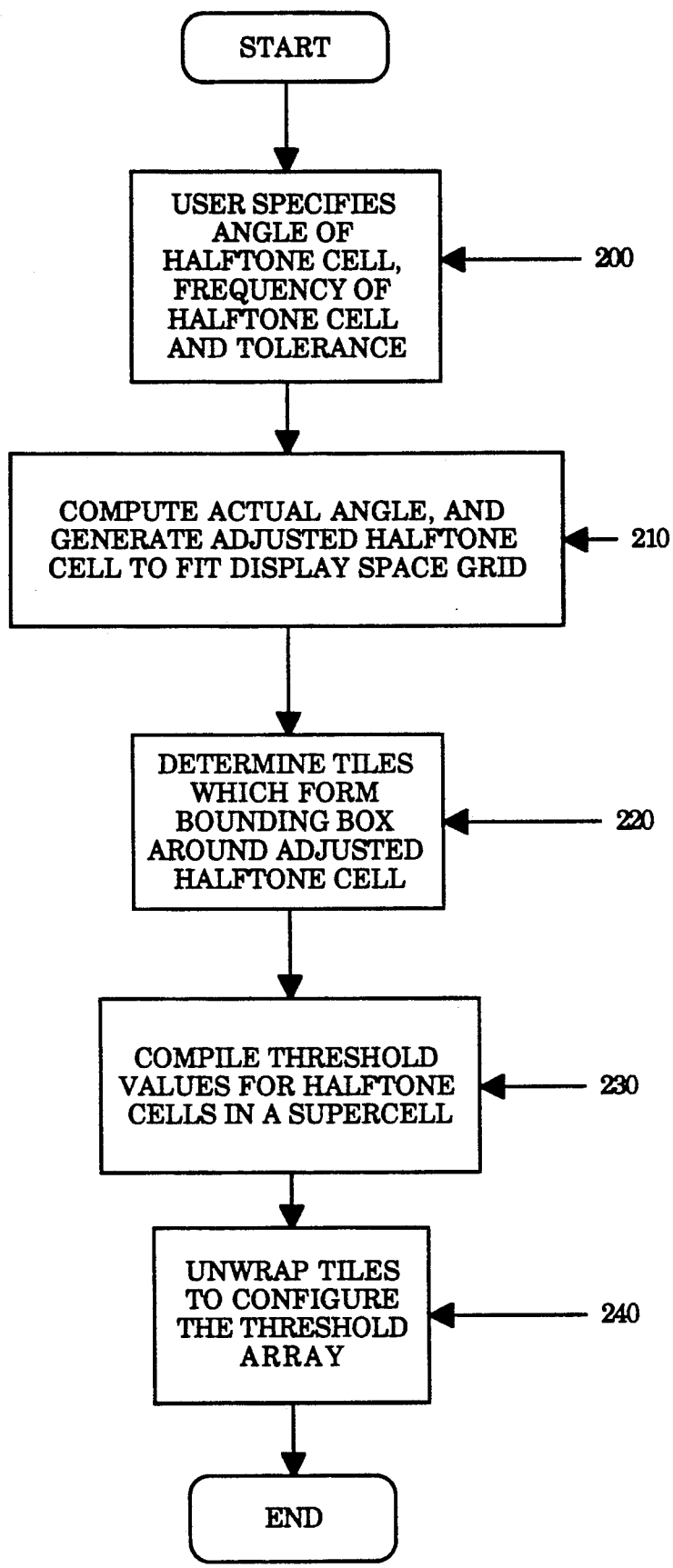
FIGS. 6a and 6b are flowcharts describing a preferred embodiment of the method of the present invention.

Once the tiles have been determined, at block 230, FIG. 6a, the threshold values to be used to perform the half-toning process are generated. The threshold values are computed according to a spot function which generates a value for each pixel which is then, during the half-toning process, compared to the desired intensity value and is used to determine whether a pixel is to be turned on or off. The spot function is a user specified mathematical function and can be one of the many spot functions known to those skilled in the art. It should be noted that the spot function and threshold values generated therefrom are illustrative only of spot functions and threshold values generated and the present invention may be implemented using a variety of spot functions and threshold values.

An exemplary spot function is the circle spot function wherein the threshold values determined from the equation $f(x,y) = 1 - x^2 - y^2$ where x and y are the coordinate values of a pixel in a halftone cell relative to the center of the half-tone cell. To generate the threshold values, the coordinate values are translated and scaled to a coordinate space centered around the half-tone cell having the limits of the space between −1 and +1. For each pixel within the half-tone cell, the x,y coordinate pair (transformed coordinates) is used to generate an intermediate value using the spot function. Once an intermediate value has been generated for each pair of the coordinate values within the halftone cell, the intermediate values are sorted according to their magnitude and the threshold values are generated based on the sorted order. For example, if a total of 50 pixels are within a single half-tone cell and the range of intensities or gray scale to be simulated is between 0 and 255, the incremental threshold value is determined to be 255÷50, which equals 5.1. Thus the first pixel after sorting which has the highest intermediate value is given a value of 255, the second pixel a value of 249.9, the third pixel a value of 244.8. This process continues until the last pixel on the sorted list is given a value of 5.1. These values are the values stored in memory and are accessed during the rendering process to generate half-tone images.

Although the tiles can be stored in memory in the form as shown for example in FIG. 7a, the process of mapping the tiles to the display space or for fetching the threshold value of a particular pixel during the rendering process is quite costly and time consuming. To minimize the amount of memory needed to store a half-tone cell and still provide a quick and simple method to access the threshold values during the rendering process, the tiles are unwrapped and organized in an array referred to as a threshold array, which provides a more simple mapping to the display space. This array is minimal in size but still is easy to access and map to the display space.

Figure 8A:
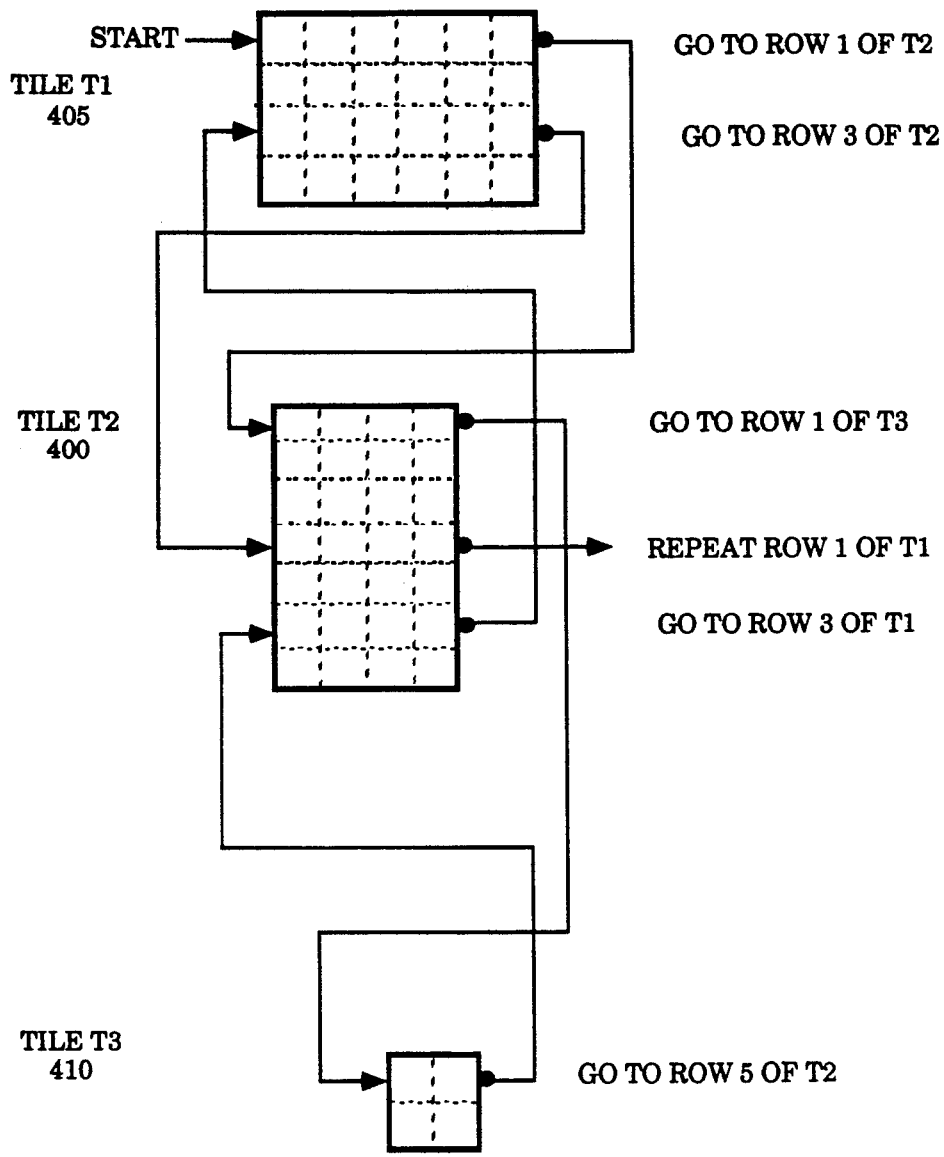
FIGS. 8a and 8b illustrate the utilization of pointers in the preferred embodiment of the present invention.
Figure 8B:
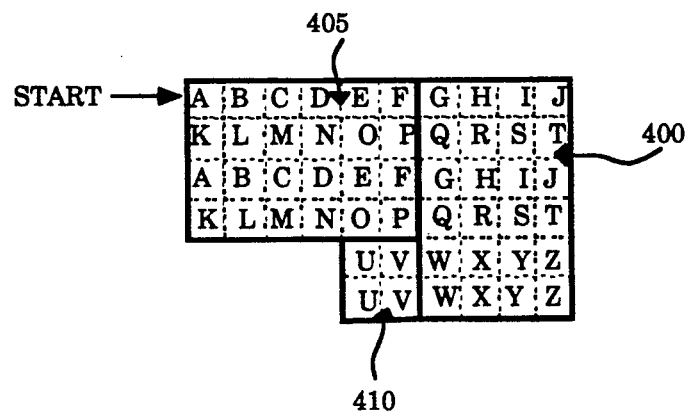

The process illustrated by FIGS. 8a and 8b illustrates how a threshold array is reconstructed from unwrapping the three tiles 400, 405, and 410. Hereinafter we refer to tile 405 as tile T1, tile 400 as tile T2 and tile 410 as tile T3. A pointer table is generated to identify the mapping of pixels in order to tile across the display space. Each entry in the pointer table corresponds to one element in the three tiles, which can be coordinated with the rendering process for generating the output values of pixels on a scan line by scan line (i.e., row by row) basis. The pointer value in the pointer table indicates the row and tile that is adjacent to the right most element in the row and tile currently being accessed for rendering. Because the spatial relationship among the five tiles 350, 355, 400, 405 and 410, is fixed across the entire display space, one pointer table is applicable for tiling across the entire display space. For example, referring to FIGS. 8a and 8b, by mapping the first pixel in the first row of tile T1 to the first pixel in the first scan line of the display space, the threshold values in that row of the tile from the left most pixel to the right most pixel are utilized to render pixels in the first scanline. When the end of the row in tile T1 is reached, the system refers to the pointer table which identifies the next tile and the row of the tile to be utilized adjacent to the right most pixel of the current row in T1. In the present illustration, as shown in FIGS. 8a and 8b, the pointer table identifies row 1 of tile T2 to follow the right most pixel of row 1 of tile T1. The threshold values in row 1 of tile T2 are utilized until the last pixel of this row is reached. At that time, the pointer table is again referenced to determined the next tile and the row of the tile which is adjacent to the right most pixel of row 1 of tile T2. The pointer table then identifies row 1 of tile T3 to be the following row adjacent to row 1 of tile T2.

Figure 9A:
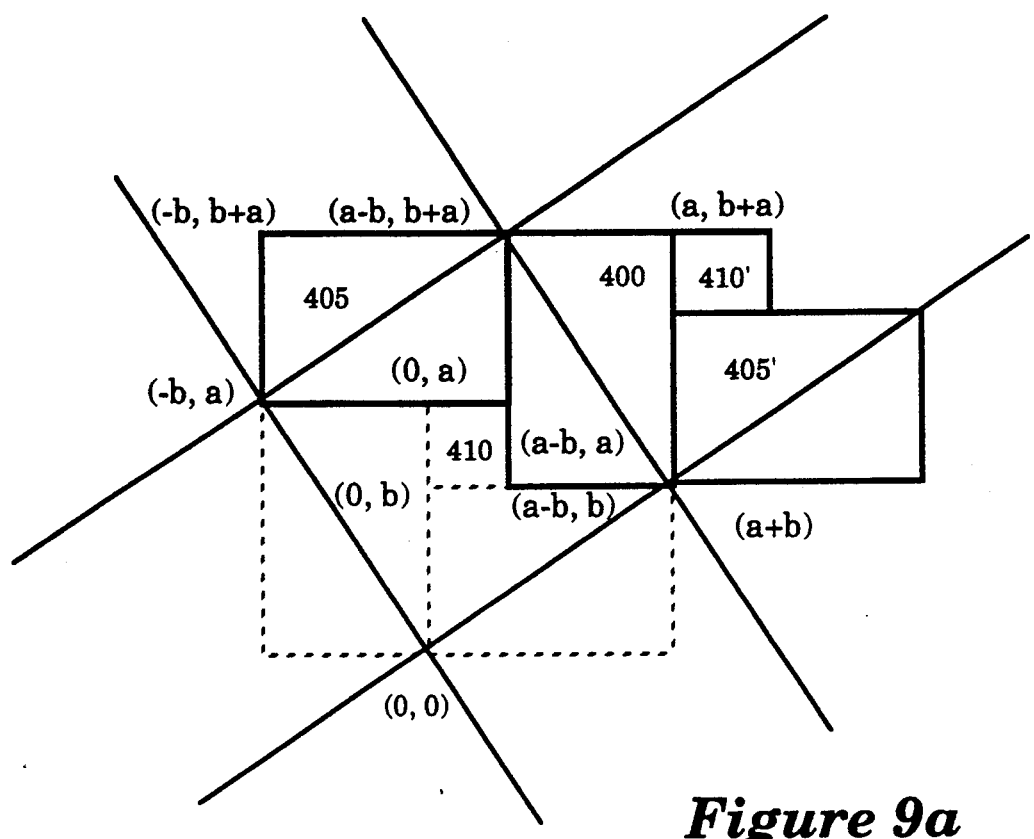
FIGS. 9a and 9b illustrate the tiling concept utilized in the preferred embodiment of the present invention.
Figure 9B:
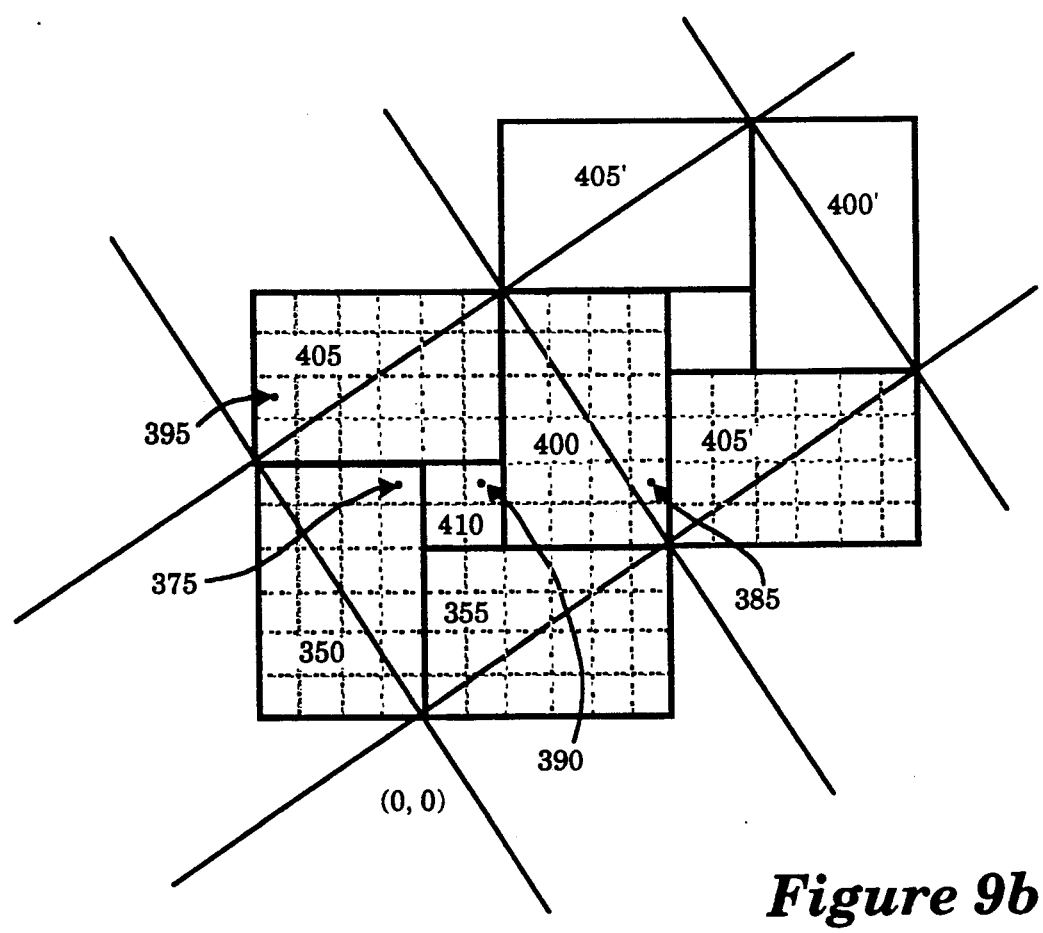

This process continues until the end of the scan line is reached, and this process is applied to each scan line of the digital image until the image is rendered. For example, referring to FIG. 9b, the pointer table entry for pixel 375 will point to the first row of the tile 410, and the pointer table entry for the right most pixel 390 in row 1 of tile 410 will point to row 5 of tile 400. The half-toning process will then access each pixel in the fifth row of tile 400 from the left to the right until the last pixel 385 is reached, the process will refer to the pointer table entry which will indicate that the first pixel 395 of the third row of tile 405 is the next to be accessed. Thus, one pointer table is generated for each single tile and the three pointer tables are all that are needed for all tiles mapped across the display space.

It has been determined that memory space can be minimized and the amount of time required to render the half-tone image can be maintained or even increased by "unwrapping" the tiles to generate a threshold array which is more compatible with the structure of memory.

Figure 10:
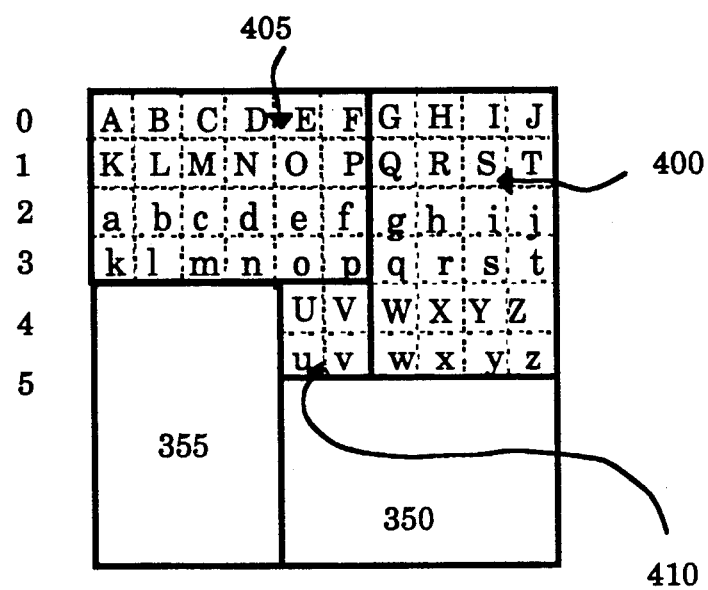
FIGS. 10a, 10b, 10c, 10d and 10e illustrate the procedure of "unwrapping" the tiles employed in the preferred embodiment of the present invention.

A rectangular array of threshold values can be derived from the three tiles to provide threshold values necessary to render an image across the display space. This is achieved by "unwrapping" the tiles into the rectangular array. The array has a width (w) and a height (h). The height h is equal to the greatest common denominator (gcd) of a and b. In the present example, a=6 and b=4. Thus h=gcd (6,4)=2. Thus the height of the array will be 2 units, e.g. pixels, high. The width of the array is determined by the number of threshold values across a scan line before the sequence of threshold values repeats itself. Referring to FIG. 10a, the tiles generated for a series of half-tone cells and their corresponding threshold values are illustrated. For purposes of explanation, the threshold values are given letter values (A-Z) and (a-z). As can be seen in FIGS. 10a and 10b by the row identified by the number 0, the threshold values generated start at A and end at J. This row contains the first row of tile 405 with threshold values A-F, and the first row of tile 400 with threshold values G-J. The next two threshold values are U, V, which correspond to a row of the center tile 410 of the half-tone cell. This is followed by a row of threshold values from tile 400, W,X,Y,Z. Adjacent to Z are the elements from the third row of tile 405, followed by the third row of tile 400, with threshold values a through j. Following the threshold value j, the sequence of threshold values are repeated. Thus the sequence of threshold values to be stored in memory are ABCDEFG-HIJUVWXYZabcdefghij and the number of elements in the repetition pattern is 26 (which is referred to as the width of the threshold array). Similarly, the same sequence is used to determine that the second row, identified as row 1, FIG. 10b, is the same width as row 0 and contains the elements KLMNOPQRST, uvwxyz, klmnopqrst.

Referring to FIG. 10a, the three basic tiles in their original orientation are identified by a row number, row 0 being A-J, row 1 being K-T, etc. The first sequence of threshold values in the array will start with the row 0 threshold values, that is, A-J. Referring to FIG. 10b and FIG. 10d, the pointer to the next row of threshold values to be used is determined according to the following equation: Row Number+b mod a, where Row number is the current row number and a and b are respectively the a and b elements used to determine the adjusted half-tone cell. Applying the equation to the 0 row to determine the row adjacent to the 0 row is (0+4) mod 6=4. Thus, the threshold values of row 4 are adjacent to the threshold values of row 0. The next row of threshold values is equal to (4+4) mod 6 which=2. The next row of threshold values adjacent is determined according to (2+4) mod 6=0, which indicates that the sequence is repeating itself because the first row of the sequence is row $\phi$. Thus the width of the pattern of threshold values to be stored in memory is equal to the width of row zero (which is 10) plus the width of row 4 (which is 6), plus the width of row 2 (which is 10), the total being 26.

Similarly, to determine the second row, the first row of threshold values is row 1, the adjacent row is identified by the equation 1+4 mod 6=5, and the next row is determined from the equation 5+4 mod 6=3. Applying the equation to the next row will generate the number 1, indicating that the sequence is starting to repeat itself. Thus, referring to FIG. 10e, the threshold array stored in memory is a 2×26 array containing the threshold values identified. It should be noted that by unwrapping the three tiles 400, 405 and 410 as illustrated in FIGS. 10a, 10b, 10c, 10d and 10e. No pointer table is physically stored in memory because the threshold array takes into account the pointer values. Furthermore, with this array of threshold values, the mapping of threshold values to the display space is simplified.

Figure 6B:
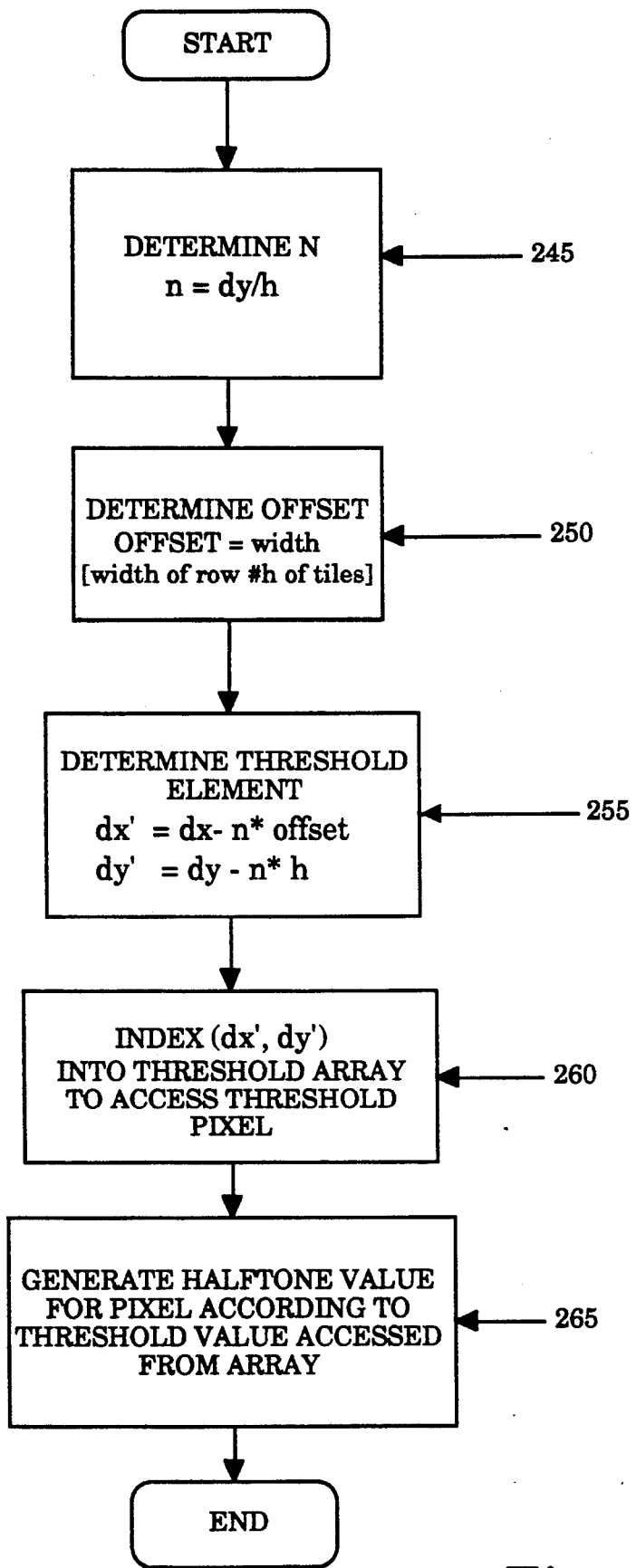
Figure 11:
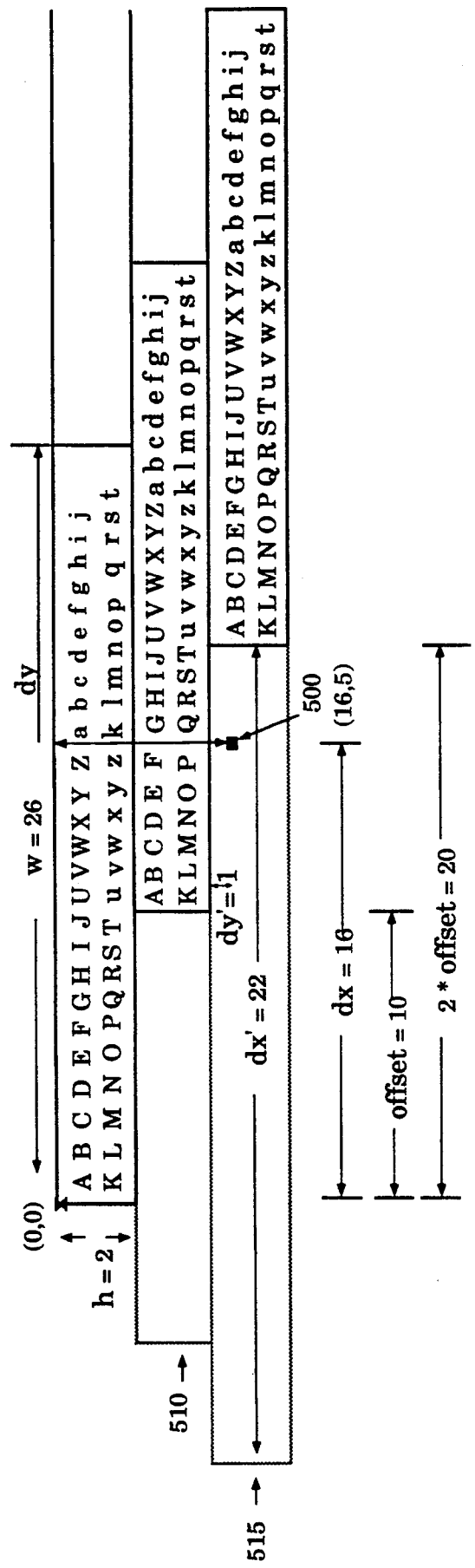
FIG. 11 illustrates the mapping of the threshold array to the display space in the preferred embodiment of the present invention.

As illustrated by the flow chart of FIG. 6b, the threshold array stored in memory may then be easily accessed to render a digital halftone image. To determine the threshold value for any pixel in the display space, a simple translation is performed to translate the coordinate of a pixel in display space into the memory address of the threshold array. To illustrate the process, the pixel 500 in FIG. 11, at the x,y coordinate location (16, 5) is utilized. At block 245, FIG. 6a, the number of rows down from the (0,0) location of the display space is determined by using the following equation: Int (dy/h) where dy is the number of pixels from location (0,0), h is the height of the threshold array and Int is an integer function. Thus in the present example, the variable n, indicative of the number of rows of threshold arrays down from (0,0)=5÷2=2.5 or the integer value of 2. It is a common practice to map the first pixel of the display space to the first pixel of the threshold array. Each row of threshold array mapped to the display space is the same except each subsequent row is shifted by a predetermined amount referred to as the offset. In the example illustrated by FIG. 11 the offset is equal to a value of 10 and the amount of offset for a particular row is equal to the value of n multiplied by the amount of offset for each row. Thus, for example, the second row of threshold arrays mapped to the display space 510 is shifted by one offset. Similarly the third row of threshold arrays mapped 515 is shifted by an amount equal to twice the amount of the offset.

At block 250, the offset is determined from the width of the row. In the present illustration the offset is determined from the row identified by the same number as the height (h) of the threshold array. In the illustration, h is equal to 2. Thus the offset is equal to the value of 10 which is the width of row 2 (elements a-j). It follows that the row 510 of threshold arrays is shifted to the right by 10 values, whereby the first row of the threshold array starts with threshold values a-j and the next row starts with threshold values k-t. Similarly, the third threshold array mapped would be right shifted 2*10=20 and therefore starts with threshold values G-J and the next row starts with threshold values Q-T.

The dy and dx coordinates for a particular pixel are mapped to the threshold array memory coordinate by a translation, whereby dx', the x distance from the origin of the threshold array, is equal to:

(dx−n*offset) mod (threshold width) where mod represents a modular function.

Similarly dy', the y distance from the origin, is equal to: dy−n*h. Using the present example, pixel 500 in FIG. 11, dx'=(16−2*10) mod 26=22 and dy'=5−2*2=1. Thus the threshold array element used to determine the half-tone value for the particular pixel 500 is located in location x=22 and y=1 in the threshold array. At block 260, FIG. 6b, the threshold value at location (22, 1) in the threshold array is accessed and at block 265 the halftone value for the pixel is generated.

Once the threshold value for the initial pixel in a row is determined, succeeding pixels in the same row can easily be identified and determined as succeeding pixels in the threshold array, wherein a wrap-around function, such as the function described earlier, is applied whereby the last pixel in the threshold array is reached. Utilizing this process, the halftone image can be quickly and simply generated while the minimal amount of memory for storage of the threshold array is used.

The invention has been described in conjunction with the preferred embodiment. It is evident that numerous alternatives, modifications, variations and uses will be apparent to those skilled in art in light of the foregoing description. For example, the preferred embodiment has been described as a row dependent scan line process where the pixels are implemented horizontally from the left side of the display space to the right. However, as it is apparent to one skilled in the art, the rendering process could conceivably be a row dependent process which is rendered from the left side of the display space to the right, or could be a column dependent process where the scan line algorithm operates in a vertical fashion from the top of the display space to the bottom or vice versa.

We claim:

1. In an image generating apparatus comprising a digital halftone system wherein a range of intensities of images are simulated to generate digital images, said images generated being output to an image output device comprising a digital display space comprising a matrix of pixels situated on an X-Y grid, a method for reducing the amount of memory required to store a threshold array to generate digital halftone images, comprising the steps of:

specifying the length of a side, angle and angle tolerance of a halftone cell to be stored in memory, said halftone cell comprising a matrix of cell threshold values which are referenced to generate a digital halftone image;

determining the actual angle and length of a side of the halftone cell adjusted to fit the display space grid;

determining a bounding box oriented along the x and y axes of the display space grid which envelops the adjusted halftone cell;

partitioning the bounding box into one or more tiles of tile threshold values, said tiles being generated according to the vertices of the halftone cell and the bounding box;

generating a mapping of tiles across the display space;
generating the tile threshold values for the tiles according to a spot function for the adjusted halftone cell;
unwrapping the tile threshold values to form the threshold array of threshold values,
said threshold array having a height equal to the greatest common denominator of the x axis increment and y axis increment between vertices of the halftone cell;
said threshold array having a width equal to the number of threshold values in a sequence of threshold values across a row of contiguous tiles which are incurred before the sequence repeats itself;
storing the threshold array of threshold values in memory, said threshold array requiring a significantly smaller amount of memory than the tiles of tile threshold values;
retrieving threshold values from the threshold array stored in memory to render pixels so as to generate the digital halftone image;
comparing the cell threshold values for each halftone cell to the threshold values from the threshold array retrieved; and
actuating pixels on the digital display space of the image output device to simulate visually predetermined intensities in predetermined areas of the digital display space to generate digital images in accordance with the comparing of the cell threshold values to the threshold array of threshold values.

2. The method according to claim 1, wherein the step of determining the actual angle and size of the halftone cell adjusted to fit the display space grid comprises the steps of:
rounding to the nearest pixel a first vertex of the halftone cell to determine the adjusted first vertex;
rounding to the nearest pixel an adjacent second vertex of the halftone cell to determine the adjusted second vertex, said second vertex located on incremental distance corresponding to a cell frequency value, said cell frequency value comprising an initial X axis increment and initial Y axis increment, said X axis increment and Y axis increment determined according to the following equations:

$$a = \text{INT}[R_d \cos \theta_d]$$

$$b = \text{INT}[R_d \sin \theta_d]$$

where a represents the initial X axis increment, b represents the initial Y axis increment, Rd represents the desired length of a side of a halftone cell and qd represents the desired angle of the halftone cell;
rounding to the nearest pixel the third vertex adjacent to the second vertex to determine the adjusted third vertex, said adjusted third vertex located an incremental distance from the adjusted second vertex corresponding to the cell frequency value, said X axis increment being equal to the initial Y axis increment and said Y axis increment being equal to the initial X axis increment;
rounding to the nearest pixel the fourth vertex, adjacent to the third vertex and first vertex, to determine the adjusted fourth vertex, said adjusted fourth vertex located an incremental distance from the adjusted third vertex corresponding to the cell frequency value, said X axis increment being equal to the initial X axi increment and said Y axis increment being equal to the initial Y axis increment;
whereby the size of the halftone cell is determined by the cell frequency value and the actual angle relative to the display space is determined according to the Tan b/a, where Tan represents a tangent function.

3. The method according to claim 2, wherein the step of determining the actual angle and size of the halftone cell adjusted to fit the display space grid further comprises the steps of:
comparing the actual angle to the desired angle; and
if the difference between the two angles is not within the angle tolerance, constructing a supercell of halftone cells having an actual angle within the angle tolerance.

4. The method according to claim 2, wherein the length of the sides of the bounding box is equal to a+b.

5. The method according to claim 2, wherein the step of determining a bounding box oriented along the x and y axes of the display space grid which envelops the adjusted halftone cell comprises the step of generating lines along the axes of the display grid of length a+b representative of the sides of the bounding box, each of said lines drawn through a vertex of the adjusted halftone cell and along the axis which is the major axis of a corresponding side of the adjusted halftone cell.

6. The method according to claim 4, wherein the step of partitioning the bounding box into one or more tiles of threshold values comprises the steps of:
generating a first tile rectangular in shape having a diagonal equal to a first side of the adjusted halftone cell whereby adjacent vertices forming the first side form the opposing vertices of the first tile;
if the first tile does not cover the entire bounding box, generating a second tile rectangular in shape having a diagonal equal to an adjacent second side of the adjusted halftone cell whereby the adjacent vertices forming the second side form the opposing vertices of the second tile;
if the first and second tiles together do not cover the entire bounding box, generating a third tile rectangular in shape having a common vertex with the first tile and common vertex with the second tile, a third vertex collinear with the first and second vertices of the adjusted halftone cell and the fourth vertex collinear with the first vertex of the halftone cell and the third vertex of the halftone cell.

7. The method according to claim 4, wherein the step of partitioning the bounding box into one or more tiles of threshold values comprises the steps of;
generating a first tile rectangular in shape having a diagonal equal to a first side of the adjusted halftone cell whereby adjacent vertices forming the first side form the opposing vertices of the first tile;
if the first tile does not cover the entire bounding box, generating a second tile rectangular in shape having a diagonal equal to an adjacent second side of the adjusted halftone cell whereby the adjacent vertices forming the second side form the opposing vertices of the second tile;
if the first and second tiles together do not cover the entire bounding box;
generating a fourth tile rectangular in shape having a diagonal equal to a third side of the adjusted halftone cell;

generating a fifth tile rectangular in shape, having a diagonal equal to a fourth side of the adjusted halftone cell;

generating a third tile rectangular in shape covering the remaining area of the bounding box not covered by the first, second, fourth and fifth tiles, said third tile having a common vertex with the first tile and common vertex with the second tile, a common vertex with the fourth tile and a common vertex with the fifth tile.

8. The method according to claim 6, wherein the step of generating the threshold values for the tiles according to a spot function for the adjusted halftone cell comprises the steps of:

translating the coordinate values of the halftone cell to an intermediate coordinate space centered around the halftone cell, the coordinate space ranging from $-1$ to $+1$;

generating an intermediate threshold value for each threshold value location in the tiles according to the spot function and the translated coordinate values; and mapping the intermediate threshold values to the range of intensities to be simulated to generate the threshold values.

9. The method according to claim 8, wherein the spot function is: $f(x,y) = 1 - x^2 - y^2$, where x and y are the translated coordinate values of a pixel in a halftone cell relative to the center of the halftone cell.

10. The method according to claim 8, wherein the step of unwrapping the tiles of threshold values to form a threshold array comprises the steps of:

determining the height of the threshold array to be equal to the greatest common denominator of a and b;

determining the contents of a first row of the threshold array by starting with an initial row of an initial tile and scanning the row of tiles until a repetition of the initial tile is reached, said contents being the threshold values of the initial tile and adjacent tiles prior to the repetition of the initial tile;

determining the contents of subsequent rows of the threshold array to be subsequent adjacent rows to the initial row of the initial tile, said subsequent rows having the same width of the first row, the number of rows determined by the height of the threshold array.

11. The method according to claim 1, wherein the step of retrieving a threshold value from the threshold array further comprises retrieving a threshold value from the threshold array for rendering a pixel at (x,y) coordinates (dx,dy), comprising the steps of:

determining the location of dy relative to the number of rows of threshold arrays, n, from the threshold array at the (O,O) location;

setting an offset to be equal to the number of threshold values in a row of tiles, the number of the row of tiles being equal to the height of the threshold array, said offset indicating the number of threshold values the threshold array is shifted for each subsequent row of threshold arrays;

generating an (x,y) index (dx',dy') into the threshold array to retrieve the threshold value for generating said display signal which renders the pixel at coordinated (dx,dy) utilizing the following equations:

$dx' = (dx - n*\text{offset}) \bmod (w)$ $dy' = (dy - n*h)$ where h is the height of the threshold array, w is the width of the threshold array and mod is a modular function.

12. The method as set forth in claim 11, wherein n is determined according to the following equation:

$n = \text{Int}(dy/h)$, where Int is an integer function.

13. The method as set forth in claim 11, wherein the threshold values corresponding to subsequent adjacent pixels to (dx,dy) may be incrementally indexed and retrieved in a sequential manner from dx' and dy'.

14. An image generating apparatus comprising a digital halftone system wherein a range of intensities are simulated by actuating pixels on an output device in a predetermined sequence to generate images, said output device comprising a digital display space comprising a matrix of pixels situated on an X-Y grid, said apparatus comprising:

a halftone cell having an initial size and angle relative to the grid of the display space, said cell to comprise a matrix of cell threshold values reference to generate a digital halftone image;

adjustment means for adjusting the halftone cell to fit to the grid of the display space;

means for generating a bounding box oriented along the x and y axes of the display space grid which envelops the adjusted halftone cell;

a set of one or more tiles of tile threshold values, said tiles generated according to the vertices of the halftone cell and the bounding box;

means for generating tile threshold values for the tiles according to a spot function for the adjusted halftone cell;

means for determining a mapping of tiles across the display space;

means for unwrapping the tiles threshold values to form a threshold array of threshold values, said threshold array having a height equal to the greatest common denominator of the x axis increment and y axis increment between vertices of the halftone cell;

said threshold array having a width equal to the number of threshold values in a sequence of threshold values across a row of contiguous tiles which are incurred before the sequence repeats itself;

memory for storage of the threshold array of threshold values, the size of the memory required to store the threshold array being significantly smaller than the amount of memory required to store the tile threshold values and the halftone cell;

accessing means for retrieving threshold values from the threshold array stored in memory to render pixels so as to generate the digital halftone image;

comparison means for comparing the cell threshold values for each halftone cell to the threshold values from the threshold array retrieved; and actuation means for actuating pixels on the digital display space of the image output device to simulate visually predetermined intensities in predetermined areas of the digital display space to generate digital images in accordance with the comparing of the cell threshold values to the threshold array of threshold values 15. The apparatus according to claim 14, wherein the adjustment means comprises:

a first rounding means to locate the nearest pixel to a first vertex of the halftone cell to determine the adjusted first vertex;

a second rounding means for rounding to the nearest pixel an adjacent second vertex of the halftone cell to determine the adjusted second vertex, said second vertex located an incremental distance corresponding to a cell frequency value, said cell frequency value comprising an initial X axis increment and initial Y axis increment, said X axis increment and Y axis increment determined according to the following equations:

$a = \text{INT}[R_d \cos \theta_d]$ $b = \text{INT}[R_d \sin \theta_d]$ where a represents the initial X axis increment, b represents the initial Y axis increment, Rd represents the desired length of a side of a halftone cell and qd represents the desired angle of the halftone cell;

a third rounding means for rounding to the nearest pixel the third vertex adjacent to the second vertex to determine the adjusted third vertex, said adjusted third vertex located an incremental distance from the adjusted second vertex corresponding to the cell frequency value, said X axis increment being equal to the initial Y axis increment and said Y axis increment being equal to the initial X axis increment;

a fourth rounding means for rounding to the nearest pixel the fourth vertex, adjacent to the third vertex and first vertex, to determine the adjusted fourth vertex, said adjusted fourth vertex located an incremental distance from the adjusted third vertex corresponding to the cell frequency value, said X axis increment being equal to the initial X axis increment and said Y axis increment being equal to the initial Y axis increment;

whereby the size of the halftone cell is determined by the cell frequency value and the actual angle relative to the display space is determined according to the Tan b/a, where Tan represents a tangent function.

16. The apparatus according to claim 14, wherein the means for generating a bounding box oriented along the x and y axes of the display space grid which envelops the adjusted halftone cell comprises line generating means which generates lines of length a+b along the axes of the display grid, said lines forming the sides of the bounding box, said line generating means draws each of said lines through a vertex of the adjusted halftone cell and along the axes which is the major axis of a corresponding side of adjusted the halftone cell.

17. The apparatus according to claim 14, wherein the set of tiles comprise:

a first tile rectangular in shape having a diagonal equal to a first side of the adjusted halftone cell whereby adjacent vertices forming the first side form the opposing vertices of the first tile;

if the first tile does not cover the entire bounding box, said set further comprises a second tile rectangular in shape having a diagonal equal to an adjacent second side of the adjusted halftone cell whereby the adjacent vertices forming the second side form the opposing vertices of the second tile;

if the first and second tiles together do not cover the entire bounding box, said set further comprises a third tile rectangular in shape having a common vertex with the first tile and common vertex with the second tile, a third vertex collinear with the first and second vertices of the adjusted halftone cell and the fourth vertex collinear with the first vertex of the halftone cell and the third vertex of the halftone cell.

18. The apparatus according to claim 14, wherein the means for generating the threshold values for the tiles comprises:

an intermediate coordinate space centered around the adjusted halftone cell having a range from $-1$ to $+1$;

translating means for translating the coordinate values of the halftone cell to the intermediate coordinate space;

means for generating an intermediate threshold value for each threshold value location in the tiles according to the spot function and the translated coordinate values;

means for mapping the intermediate threshold values to the range of intensities to be simulated to generate the threshold values; and replacement means for storing in the tiles the intensities mapped to the intermediate threshold values.

19. The apparatus according to claim 18, wherein the spot function is: $-f(x,y) = 1 - x^2 - y^2$, where x and y are the translated coordinate values of a pixel in a halftone cell relative to the center of the halftone cell.

20. The apparatus according to claim 14, wherein said accessing means for retrieving a threshold value from the threshold array for rendering a pixel at (x,y) coordinates (dx,dy), comprising:

means for determining the location of dy relative to the number of rows of threshold arrays, n, from the threshold array at the (0,0) location;

means for setting an offset to be equal to the number of threshold values in a row of tiles, the number of the row of tiles being equal to the height of the threshold array, said offset indicating the number of threshold values the threshold array is shifted for each subsequent row of threshold arrays;

means for generating an (x,y) index (dx', dy') into the threshold array to retrieve the threshold value to render the pixel at coordinated (dx, dy) utilizing the following equations:

$dx' = (dx - n*\text{offset}) \bmod (w)$ $dy' = (dy - n*h)$ where h is the height of the threshold array, w is the width of the threshold array and mod is a modular function.

21. The apparatus according to claim 14, further comprising accessing means for retrieving a threshold value from the threshold array for rendering a pixel at (x,y) coordinates (dx, dy), comprising:

means for determining the location of dy relative to the number of rows of threshold arrays, n, from the threshold array at the (0,0) location;

means for setting an offset to be equal to the number of threshold values in a row of tiles, the number of the row of tiles being equal to the height of the threshold array, said offset indicating the number of threshold values the threshold array is shifted for each subsequent row of threshold arrays;

means for generating an (x,y) index (dx′, dy′) into the threshold array to retrieve the threshold value to render the pixel at coordinated (dx, dy) utilizing the following equations:

$$dx' = (dx - n*\text{offset}) \bmod (w)$$

$$dy' = (dy - n*h)$$

where h is the height of the threshold array, w is the width of the threshold array and mod is a modular function.

* * * * *

UNITED STATES PATENT AND TRADEMARK OFFICE
CERTIFICATE OF CORRECTION

PATENT NO.   : 5,267,054
DATED        : November 30, 1993
INVENTOR(S)  : Chang et al.

It is certified that error appears in the above-identified patent and that said Letters Patent is hereby corrected as shown below:

In column 18, claim 19 at line 27, please delete " - " before f(x,y).

Signed and Sealed this

Twenty-fourth Day of February, 1998

Attest:

BRUCE LEHMAN

Attesting Officer            Commissioner of Patents and Trademarks